United States Patent
Kim et al.

(10) Patent No.: US 11,922,692 B2
(45) Date of Patent: Mar. 5, 2024

(54) VEHICLE DISPLAYING AUGMENTED REALITY IMAGE OF POINT OF INTEREST, AND CONTROL METHOD THEREOF

(71) Applicants: Hyundai Motor Company, Seoul (KR); Kia Corporation, Seoul (KR)

(72) Inventors: Soobin Kim, Seoul (KR); Jae Yul Woo, Seoul (KR); Seunghyun Woo, Seoul (KR); Rowoon An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/829,710

(22) Filed: Jun. 1, 2022

(65) Prior Publication Data
US 2023/0064993 A1    Mar. 2, 2023

(30) Foreign Application Priority Data
Aug. 25, 2021  (KR) .......................... 10-2021-0112522

(51) Int. Cl.
*G06V 20/20*  (2022.01)
*G06V 20/56*  (2022.01)

(52) U.S. Cl.
CPC .............. *G06V 20/20* (2022.01); *G06V 20/56* (2022.01)

(58) Field of Classification Search
CPC ....... G06V 20/20; G06V 20/56; B60W 50/14; B60W 40/02; B60W 40/105; B60W 2050/146; B60W 2420/42; B60W 2520/10; B60K 35/00; B60K 2370/152; B60K 2370/177; B60K 2370/21; B60K 2370/347; B60K 2370/52

See application file for complete search history.

(56) References Cited

U.S. PATENT DOCUMENTS

| | | | |
|---|---|---|---|
| 10,775,193 B2 | 9/2020 | Ueda et al. | |
| 2019/0180485 A1* | 6/2019 | Kim | ......................... G06T 11/60 |
| 2020/0361482 A1* | 11/2020 | Choi | ..................... B60W 50/14 |

FOREIGN PATENT DOCUMENTS

| | | |
|---|---|---|
| JP | 2011158287 A | 8/2011 |
| JP | 2013-170875 A | 9/2013 |
| KR | 100981175 B1 | 9/2010 |
| KR | 2020-0087079 A | 7/2020 |
| KR | 102175042 B1 | 11/2020 |
| WO | 2013/136452 A1 | 9/2013 |

* cited by examiner

*Primary Examiner* — Jitesh Patel
(74) *Attorney, Agent, or Firm* — Fox Rothschild LLP

(57) ABSTRACT

A vehicle and a control method may adjust an augmented reality (AR) image of a point of interest (POI) based on at least one of a driving speed of the vehicle or a distance between the vehicle and the POI. The vehicle may include: an image sensor configured to obtain a front image of the vehicle; a display module configured to display the front image; and a controller configured to control the display module to display an AR image of a POI included in the front image by being superimposed on the front image, and adjust the AR image so that at least one of an amount of information or a size is changed based on at least one of a driving speed of the vehicle or a distance between the vehicle and the POI.

20 Claims, 10 Drawing Sheets

FIG. 5

| DISTANCE / SPEED | LESS THAN OR EQUAL TO PREDETERMINED DISTANCE | EXCEEDING PREDETERMINED DISTANCE |
|---|---|---|
| LESS THAN OR EQUAL TO PREDETERMINED SPEED | INFORMATION-TYPE (BUSINESS TYPE, BUSINESS, REMAINING DISTANCE, PRICE, USE) MAXIMUM SIZE | BASIC TYPE (BUSINESS TYPE, BUSINESS, REMAINING DISTANCE) MEDIUM SIZE |
| EXCEEDING PREDETERMINED SPEED | BASIC TYPE (BUSINESS TYPE, BUSINESS, REMAINING DISTANCE) MEDIUM SIZE | CATEGORY-TYPE (BUSINESS TYPE) MINIMUM SIZE |

VEHICLE DISPLAYING AUGMENTED REALITY IMAGE OF POINT OF INTEREST, AND CONTROL METHOD THEREOF

CROSS-REFERENCE TO RELATED APPLICATION

This application claims under 35 U.S.C. § 119 the benefit of Korean Patent Application No. 10-2021-0112522, filed on Aug. 25, 2021 in the Korean Intellectual Property Office, the entire contents of which are incorporated herein by reference.

BACKGROUND

(a) Technical Field

The disclosure relates to a vehicle that displays an augmented reality (AR) image of a point of interest (POI), and a control method thereof.

(b) Description of the Related Art

Recently, services using augmented reality (AR) have increasingly been incorporated into vehicles. A driver of a vehicle may be provided with useful information through an augmented reality service.

For example, a map and navigation service using AR technology may display an AR image of a point of interest (POI) related to various types of businesses such as a restaurant, a café, a grocery store, etc., at a location of the corresponding POI. That is, when a vehicle photographs a POI, an AR image of the POI which is superimposed on the photographed image may be displayed at the location of the POI.

However, when an AR image is provided in a same size regardless of a vehicle speed or a distance to the POI, an accuracy of the AR image may decrease and a user's driving may be impeded.

SUMMARY

An aspect of the disclosure provides a vehicle and a control method thereof that may adjust an augmented reality (AR) image of a point of interest (POI) based on at least one of a driving speed of the vehicle or a distance between the vehicle and the POI.

Additional aspects of the disclosure will be set forth in part in the description which follows and, in part, will be obvious from the description, or may be learned by practice of the disclosure.

According to an aspect of the disclosure, there is provided a vehicle, including: an image sensor configured to obtain a front image of the vehicle; a display module configured to display the front image; and a controller configured to control the display module to display an augmented reality (AR) image of a point of interest (POI) included in the front image by being superimposed on the front image, and adjust the AR image so that at least one of an amount of information of the AR image or a size of the AR image is changed based on at least one of a driving speed of the vehicle or a distance between the vehicle and the POI.

The controller is configured to adjust the AR image so that the amount of information of the AR image and the size of the AR image increase, as the driving speed of the vehicle decreases.

The controller is configured to adjust the AR image so that the amount of information of the AR image and the size of the AR image increase, as the distance between the vehicle and the POI decreases.

The controller is configured to adjust the AR image to be displayed in one of a minimum size or a medium size, when the distance between the vehicle and the POI exceeds a predetermined distance.

The controller is configured to adjust the AR image to include information about a business type only, when the distance between the vehicle and the POI exceeds the predetermined distance and the driving speed of the vehicle exceeds a predetermined speed.

The controller is configured to adjust the AR image to include information about at least one of a business type, a business, or a remaining distance, when the distance between the vehicle and the POI exceeds the predetermined distance and the driving speed of the vehicle is less than or equal to a predetermined speed.

The controller is configured to adjust the AR image to be displayed in one of a maximum size or a medium size, when the distance between the vehicle and the POI is less than or equal to a predetermined distance.

The controller is configured to adjust the AR image to include information about a business type, a business, and a remaining distance, when the distance between the vehicle and the POI is less than or equal to the predetermined distance and the driving speed of the vehicle exceeds a predetermined speed.

The controller is configured to adjust the AR image to include information about a business type, a business, a remaining distance, a price and use, when the distance between the vehicle and the POI is less than or equal to the predetermined distance and the driving speed of the vehicle exceeds a predetermined speed.

The controller is configured to adjust the AR image so that a transparency of the AR image is changed based on the distance between the vehicle and the POI.

According to an aspect of the disclosure, there is provided a control method of a vehicle including an image sensor configured to obtain a front image of the vehicle and a display module configured to display the front image, the control method including: controlling, by a controller, the display module to display an AR image of a POI included in the front image by being superimposed on the front image; and adjusting, by the controller, the AR image so that at least one of an amount of information of the AR image or a size of the AR image is changed based on at least one of a driving speed of the vehicle or a distance between the vehicle and the POI.

The adjusting of the AR image includes adjusting the AR image so that the amount of information of the AR image and the size of the AR image increase, as the driving speed of the vehicle decreases.

The adjusting of the AR image includes adjusting the AR image so that the amount of information of the AR image and the size of the AR image increase, as the distance between the vehicle and the POI decreases.

The adjusting of the AR image includes adjusting the AR image to be displayed in one of a minimum size or a medium size, when the distance between the vehicle and the POI exceeds a predetermined distance.

The adjusting of the AR image includes adjusting the AR image to include information about a business type only, when the distance between the vehicle and the POI exceeds the predetermined distance and the driving speed of the vehicle exceeds a predetermined speed.

The adjusting of the AR image includes adjusting the AR image to include information about at least one of a business type, a business, or a remaining distance, when the distance between the vehicle and the POI exceeds the predetermined distance and the driving speed of the vehicle is less than or equal to a predetermined speed.

The adjusting of the AR image includes adjusting the AR image to be displayed in one of a maximum size or a medium size, when the distance between the vehicle and the POI is less than or equal to a predetermined distance.

The adjusting of the AR image includes adjusting the AR image to include information about a business type, a business, and a remaining distance, when the distance between the vehicle and the POI is less than or equal to the predetermined distance and the driving speed of the vehicle exceeds a predetermined speed.

The adjusting of the AR image includes adjusting the AR image to include information about a business type, a business, a remaining distance, a price and use, when the distance between the vehicle and the POI is less than or equal to the predetermined distance and the driving speed of the vehicle exceeds a predetermined speed.

The control method of the vehicle further includes adjusting the AR image so that a transparency of the AR image is changed based on the distance between the vehicle and the POI.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 is a diagram illustrating an example where a vehicle adjusts an AR image based on at least one of a driving speed of the vehicle or a distance between the vehicle and a POI according to an embodiment;

DETAILED DESCRIPTION

Figure 1:
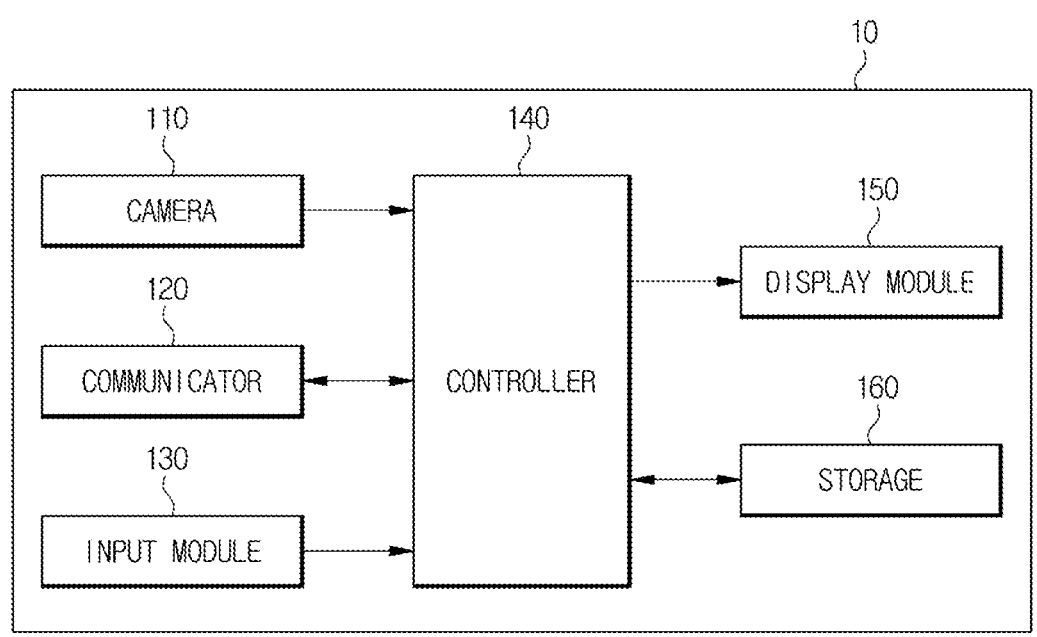
FIG. 1 is a control block diagram illustrating a vehicle according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the disclosure.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Like reference numerals throughout the specification denote like elements. Also, this specification does not describe all the elements according to embodiments of the disclosure, and descriptions well-known in the art to which the disclosure pertains or overlapped portions are omitted.

It will be understood that when an element is referred to as being "connected" to another element, it can be directly or indirectly connected to the other element, wherein the indirect connection includes "connection" via a wireless communication network.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, a vehicle and a control method thereof according to an aspect of the disclosure will be described in detail with reference to the accompanying drawings.

FIG. 1 is a control block diagram illustrating a vehicle according to an embodiment.

Referring to FIG. 1, a vehicle 10 according to an embodiment includes a camera 110, a communicator 120, an input module 130, a controller 140, a display module 150 and a storage 160. The camera 110 obtains a front image of the vehicle 10 by photographing a front of the vehicle 10. The communicator 120 performs communication with an external electronic device, and the input module 130 receives an input from a user. The controller 140 controls an augmented reality (AR) image of a point of interest (POI) to be displayed by being superimposed on the front image, and adjusts the AR image of the POI based on at least one of a driving speed of the vehicle 10 or a distance between the vehicle 10 and the POI. The display module 150 displays the front image and the AR image, and the storage 160 stores various information required for control.

However, a configuration of the vehicle 10 shown in FIG. 1 is only one embodiment, and thus a portion of configuration shown in FIG. 1 may be omitted or a constituent component not shown in FIG. 1 may be added according to other embodiments.

In this instance, the POI may correspond to various types of shops, infrastructures, and facilities such as parking lots, gas stations, charging stations, cafes, restaurants, bus stops, subway stations, and the like.

According to an embodiment, the camera 110 may be provided in a main body (not shown) of the vehicle 10 and photograph the front of the vehicle 10 to obtain the front image of the vehicle 10. To this end, the camera 110 may be provided as a known type of image sensor.

According to an embodiment, the communicator 120 may transmit and receive information to and from the external electronic device by wire or wirelessly. For instance, the communicator 120 may receive information about the POI from an external server, and transmit information about the POI obtained based on a user's input to the external server. To this end, the communicator 120 may be provided as a known type of wired communication module and/or wireless communication module.

According to an embodiment, the input module 130 may receive the user's input.

For example, the input module 130 may receive a selection on the POI from the user. Specifically, the input module 130 may receive a selection on the POI that the user desires to be provided with the AR image from a plurality of POIs.

Also, the input module 130 may receive information about the POI from the user. Specifically, the input module 130 may receive a review on the POI from the user.

To this end, the input module 130 may be provided as a known type of input module, and according to embodiments, be configured as a touch panel provided integrally with the display module 150.

According to an embodiment, the controller 140 may control the display module 150 to display the front image, and control the display module 150 to display the AR image of the POI included in the front image by being superimposed on the front image.

That is, the controller 140 may control the display module 150 to display the AR image of the POI, positioned in a shooting direction of the camera 110 and photographed through the camera 110, by being superimposed on the front image.

The controller 140 may identify the POI, positioned in the shooting direction of the camera 110 and photographed through the camera 110, based on location information (e.g., global positioning system (GPS) information) of the POI and location information of the vehicle 10.

In this instance, the AR image corresponding to the POI may be stored in the storage 160, and be updated based on the information about the POI received through the communicator 120.

The AR image of the POI may include information about the POI such as information about a business type, a business, a remaining distance, a price, use, and the like. Also, the amount of information and/or size of the AR image may be adjusted based on the driving speed of the vehicle 10 or the distance between the vehicle 10 and the POI.

In this instance, the amount of information may correspond to the number of pieces of information included in the AR image. For instance, an information-type AR image including a large amount of information may include the information about a business type, a business, a remaining distance, a price and use. Also, a basic type AR image including a relatively smaller amount of information than the information-type AR image may include the information about a business type, a business, and a remaining distance. In addition, a category-type AR image including a relatively smaller amount of information than the basic type AR image may include the information about a business type, i.e., a category of the POI only.

According to an embodiment, the controller 140 may adjust the AR image of the POI, so that at least one of the amount of information or the size is changed based on at least one of the driving speed of the vehicle 10 or the distance between the vehicle 10 and the POI.

Specifically, the controller 140 may adjust the AR image so that the amount of information and the size increase, as the driving speed of the vehicle 10 decreases. That is, as the vehicle 10 is driving fast, the controller 140 may reduce the amount of information, thereby may compensate for an accuracy of the AR image that may be decreased at high speed. Also, the controller 140 may increase the amount of information of the AR image in an area where surrounding objects are well recognized, such as a stopping area or traffic signal area, thereby may provide the user with rich service content.

Also, as the distance between the vehicle 10 and the POI decreases, the controller 140 may adjust the AR image so that the amount of information and the size increase. That is, the controller 140 may provide detailed information when the distance to the POI is short, and provide only brief information when the distance to the POI is long to provide an intuitive AR image to the user.

For instance, the controller 140 may determine a type of the AR image as one of the category-type AR image, the basic type AR image, and the information-type AR image, based on a predetermined speed and a predetermined distance.

In this instance, the category-type AR image may include the category of the POI, i.e., the information about a business type only, and be configured in small size (e.g., a size corresponding to 15% of a vertical width of the display module 150).

Also, the basic type AR image may include the information about a business type, a business, and a remaining distance of the POI, and be configured in medium size (e.g., a size corresponding to 20-25% of the vertical width of the display module 150).

In addition, the information-type AR image may include the information about a business type, a business, a remaining distance, a price and use of the POI, and be configured in maximum size (e.g., a size corresponding to 25~30% of the vertical width of the display module 150).

According to an embodiment, the controller 140 may adjust the AR image so that a transparency is changed based on the distance between the vehicle 10 and the POI. That is, as the distance between the vehicle 10 and the POI decreases, the controller 140 may adjust the AR image so that the transparency is decreased. Accordingly, a viewing angle may be secured at a long distance and information may be provided to the user without impeding the user's driving.

Adjusting the AR image based on at least one of the driving speed of the vehicle 10 or the distance between the vehicle 10 and the POI will be described in greater detail later.

According to an embodiment, when a plurality of POIs are included in the front image, the controller 140 may control the display module 150 to first display an AR image of a POI closest to the vehicle 10.

According to an embodiment, when the driving speed of the vehicle 10 exceeds the predetermined speed (e.g., 20 km/h) or the distance between the vehicle 10 and the POI exceeds the predetermined distance (e.g., 100 m), the controller 140 may control the display module 150 not to display the AR image for safe driving.

The controller 140 may include at least one memory storing a program for performing aforementioned operations and operations described below, and at least one processor implementing a stored program. When a plurality of memories and processors are provided, the plurality of memories and processors may be integrated into one chip, or provided in physically separated locations.

According to an embodiment, the display module 150 may be provided inside of the vehicle 10 and display the front image and the AR image. To this end, the display module 150 may be provided as a known type of display panel.

According to an embodiment, the storage 160 may store various information required for control. For example, the storage 160 may store information (e.g., location information, AR image information, etc.) about the POI. To this end, the storage 160 may be provided as a known type of storage medium.

Figure 2:
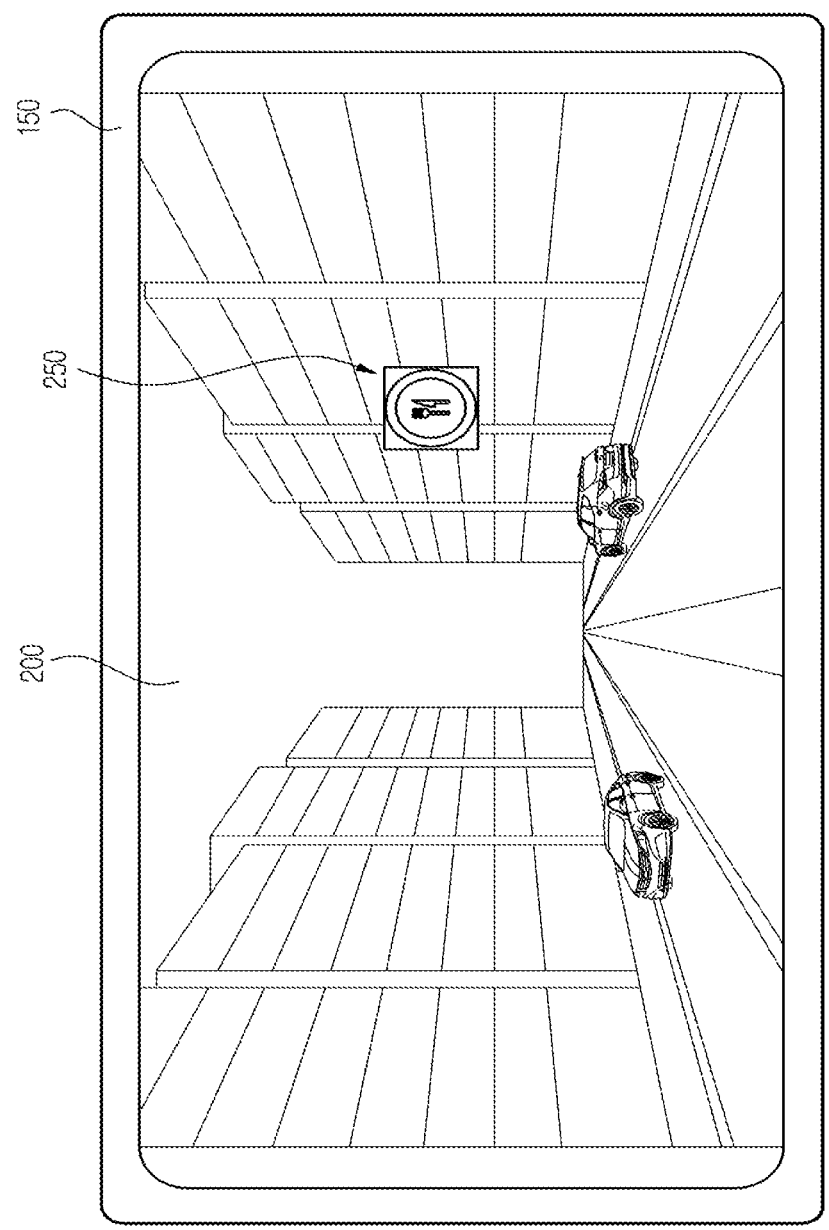
FIG. 2 is a diagram illustrating an example where a vehicle displays an augmented reality (AR) image of a point of interest (POI) by being superimposed on a front image according to an embodiment.

FIG. 2 is a diagram illustrating an example where the vehicle 10 displays an AR image of a POI by being superimposed on a front image according to an embodiment.

Referring to FIG. 2, the vehicle 10 according to an embodiment may control the display module 150 to display a front image 200, and also control the display module 150 to display an AR image 250 of a POI included in the front image 200 by being superimposed on the front image 200.

That is, the vehicle 10 may determine the POI, located in front of the vehicle 10 and may be photographed by the camera 110, based on location information of the vehicle 10 and location information of the POI, and also control the display module 150 to display the AR image 250 corresponding to the determined POI by being superimposed on the front image 200.

In this instance, the AR image 250 may be located at a position where the POI is located in the front image 200 based on the location information of the POI.

The AR image corresponding to the POI may be stored in the storage 160 and be updated based on information about the POI received through the communicator 120.

The AR image of the POI may include information about the POI, such as information about a business type, a business, a remaining distance, a price, use, and the like, and the amount of information and/or a size of the AR image of the POI may be adjusted based on a driving speed of the vehicle 10 or a distance between the vehicle 10 and the POI.

Figure 3:
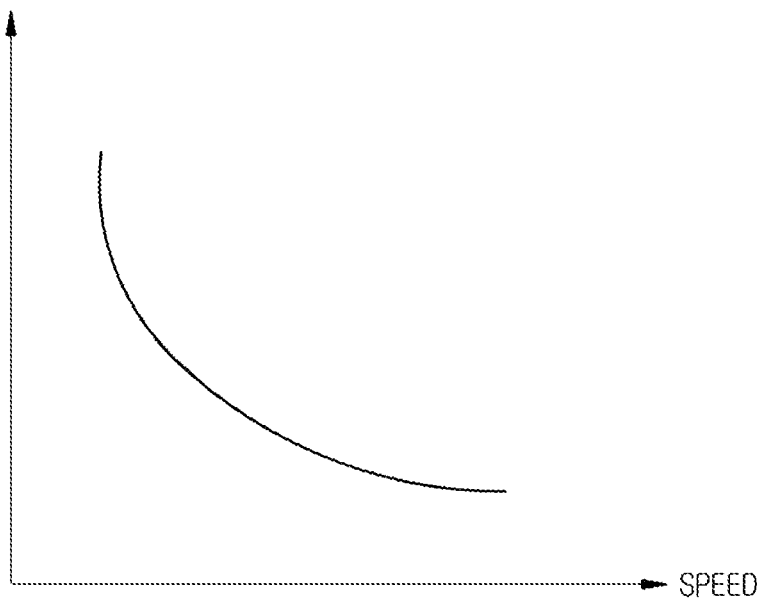
FIG. 3 is a diagram illustrating that a vehicle adjusts an AR image based on a driving speed of the vehicle according to an embodiment.
Figure 4:
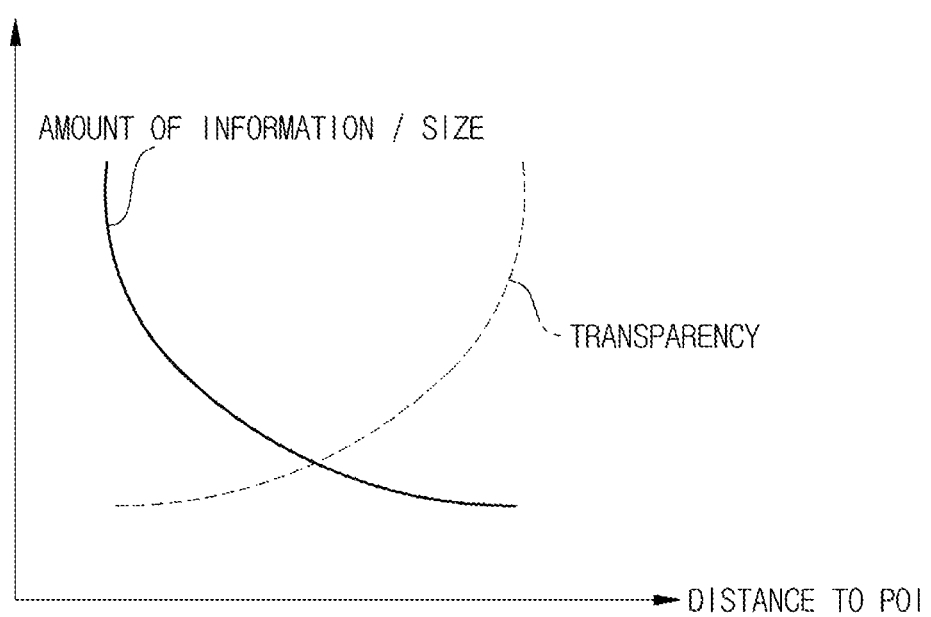
FIG. 4 is a diagram illustrating that a vehicle adjusts an AR image based on a distance between the vehicle and a POI according to an embodiment.

FIG. 3 is a diagram illustrating that the vehicle 10 adjusts the AR image 250 based on a driving speed of the vehicle 10 according to an embodiment, and FIG. 4 is a diagram illustrating that the vehicle 10 adjusts the AR image 250 based on a distance between the vehicle 10 and a POI according to an embodiment.

Referring to FIGS. 3 and 4, the vehicle 10 according to an embodiment may adjust the AR image 250 so that at least one of the amount of information or a size is changed based on at least one of a driving speed of the vehicle 10 or a distance between the vehicle 10 and the POI.

Specifically, as shown in FIG. 3, as the driving speed of the vehicle 10 decreases, the vehicle 10 may adjust the AR image 250 so that the amount of information and the size increase.

That is, as the driving speed of the vehicle 10 increases, the controller 140 may reduce the amount of information, thereby may compensate for an accuracy of the AR image 250 that may be decreased at high speed. Also, the controller 140 may increase the amount of information of the AR image 250 in an area where surrounding objects are well recognized, such as a stopping area or traffic signal area, thereby may provide a user with rich service content.

Also, as shown in FIG. 4, as the distance between the vehicle 10 and the POI decreases, the vehicle 10 may adjust the AR image 250 so that the amount of information and the size increase. That is, the controller 140 may provide detailed information when the distance to the POI is short, and provide only brief information when the distance to the POI is long to provide an intuitive AR image to the user.

In addition, as shown in FIG. 4, according to embodiments, the vehicle 10 may adjust the AR image 250 so that a transparency is changed based on the distance between the vehicle 10 and the POI. That is, as the distance between the vehicle 10 and the POI decreases, the controller 140 may adjust the AR image 250 so that the transparency is decreased. Accordingly, a viewing angle may be secured at a long distance and information may be provided to the user without impeding the user's driving.

Figure 6:
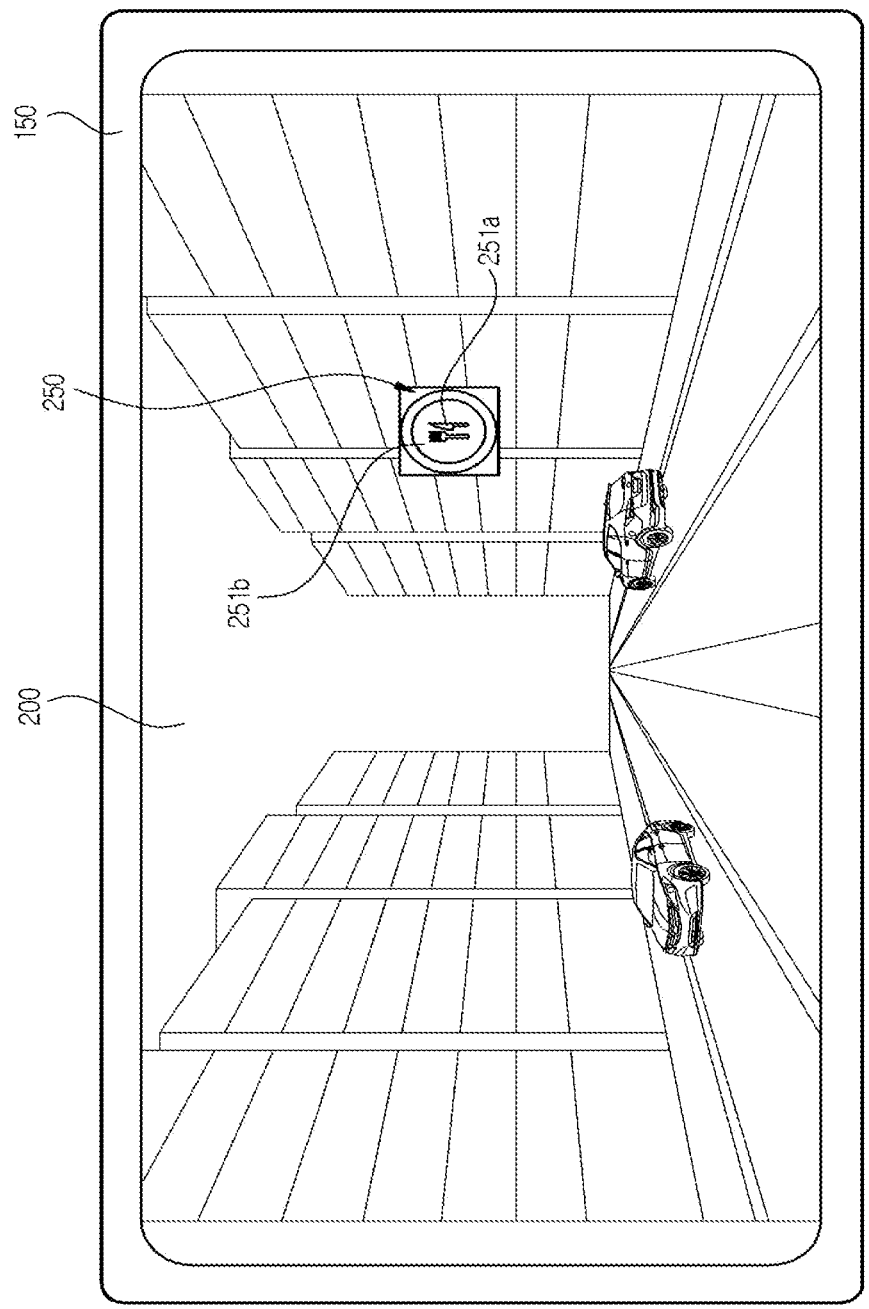
FIG. 6 is a diagram illustrating an example of a category-type AR image displayed by a vehicle according to an embodiment.
Figure 7:
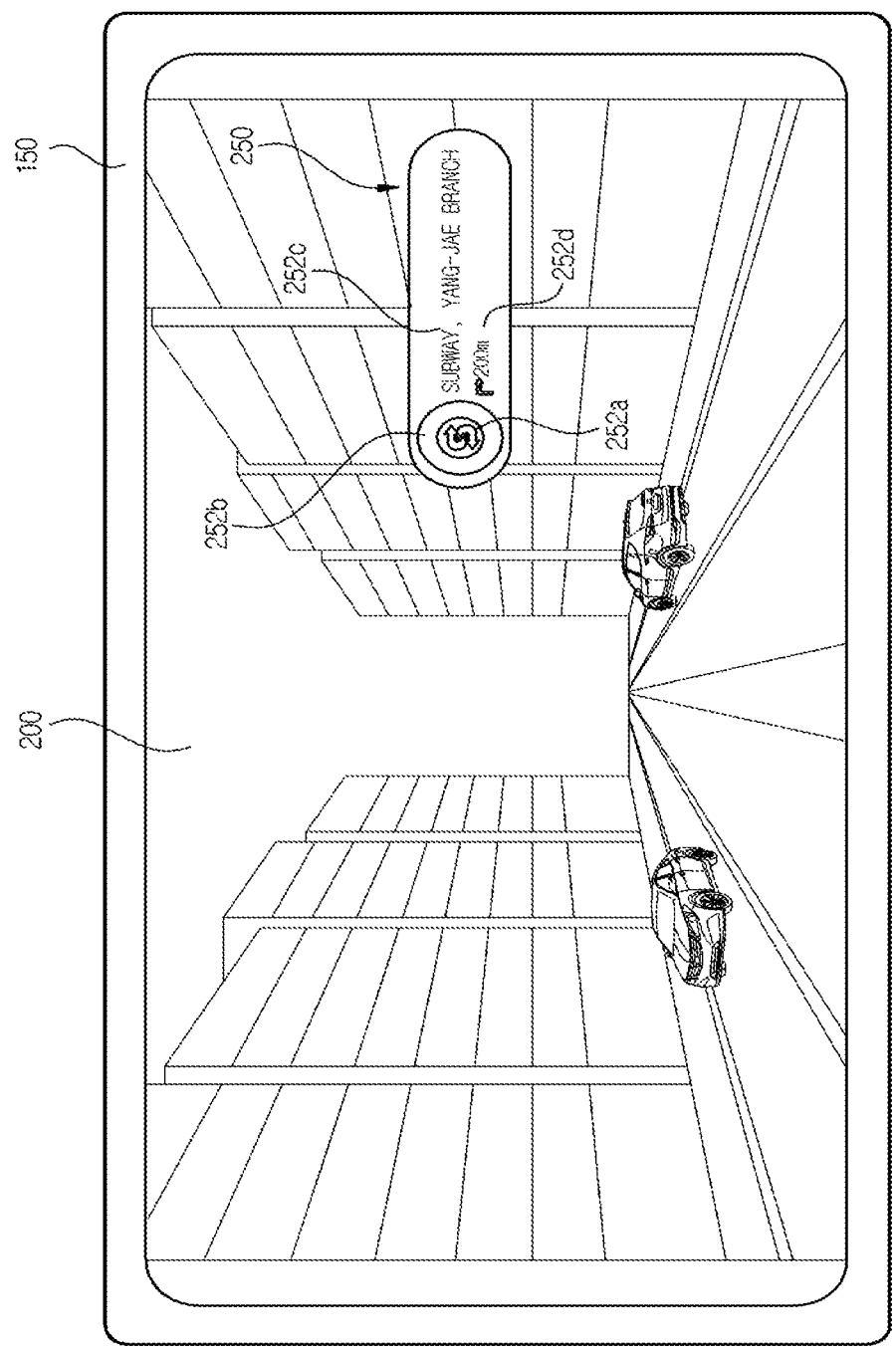
FIG. 7 is a diagram illustrating an example of a basic type AR image displayed by a vehicle according to an embodiment.
Figure 8:
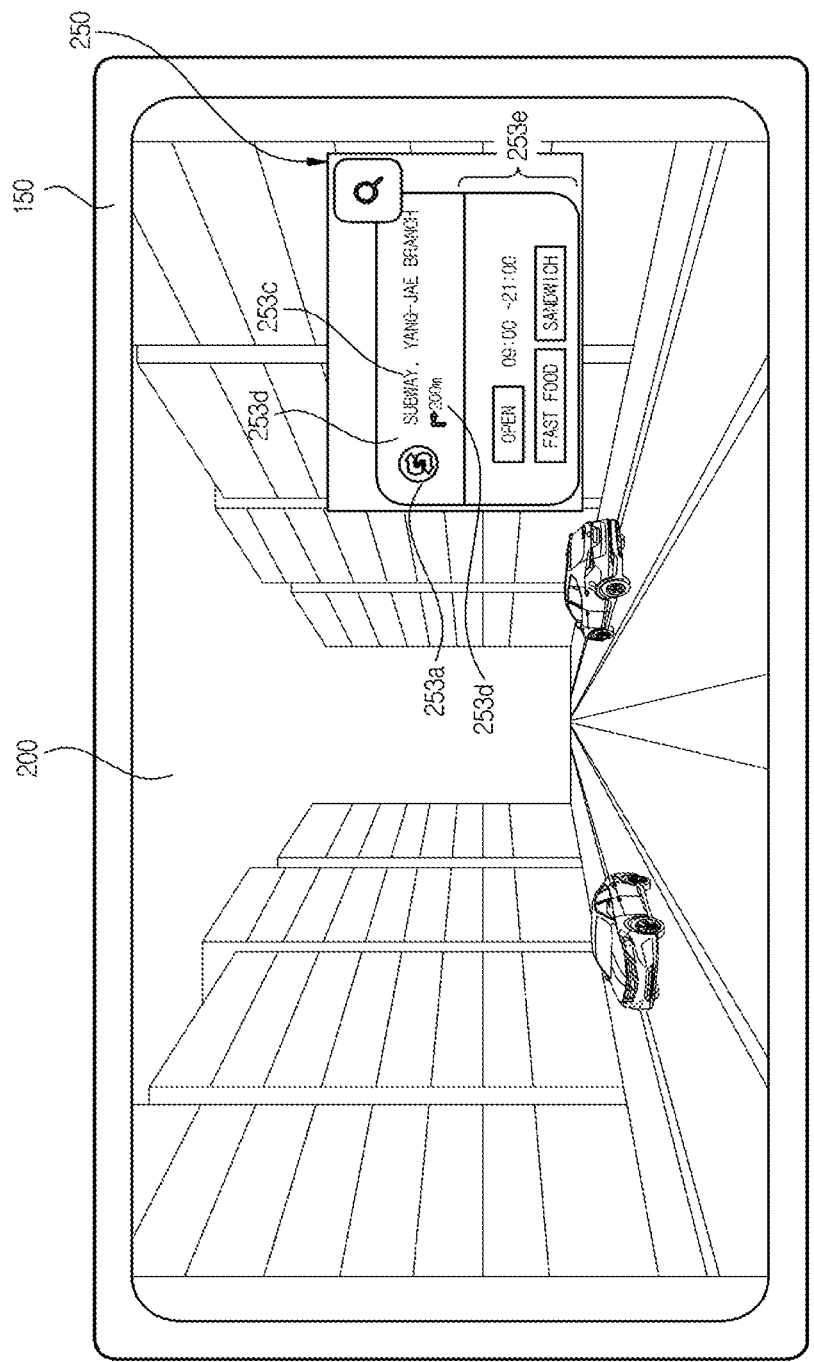
FIG. 8 is a diagram illustrating an example of an information-type AR image displayed by a vehicle according to an embodiment.

FIG. 5 is a diagram illustrating an example where the vehicle 10 adjusts the AR image 250 based on at least one of a driving speed of the vehicle 10 or a distance between the vehicle 10 and a POI according to an embodiment. FIG. 6 is a diagram illustrating an example of a category-type AR image 250 displayed by the vehicle 10 according to an embodiment. FIG. 7 is a diagram illustrating an example of a basic type AR image 250 displayed by the vehicle 10 according to an embodiment. FIG. 8 is a diagram illustrating an example of an information-type AR image 250 displayed by the vehicle 10 according to an embodiment.

Referring to FIG. 5, the vehicle 10 according to an embodiment may determine a type of the AR image 250 as one of the category-type AR image, the basic type AR image, and the information-type AR image, based on a predetermined speed and a predetermined distance.

Through the above, the vehicle 10 may provide the AR image 250 having the amount of information and size corresponding to the driving speed of the vehicle 10 and the distance between the vehicle 10 and the POI.

Specifically, when the distance between the vehicle 10 and the POI exceeds the predetermined distance (e.g., 20 m), the vehicle 10 according to an embodiment may adjust the AR image 250 to be displayed in at least one of a minimum size or a medium size.

For example, when the distance between the vehicle 10 and the POI exceeds the predetermined distance and the driving speed of the vehicle 10 exceeds the predetermined speed (e.g., 15 km/h), the vehicle 10 may adjust the AR image 250 to include information about a business type only.

That is, as shown in FIG. 6, when the distance between the vehicle 10 and the POI exceeds the predetermined distance and the driving speed of the vehicle 10 exceeds the predetermined speed, the vehicle 10 may display the category-type AR image 250 including the information about the business type only in minimum size by being superimposed on the front image 200.

As shown in FIG. 6, the category-type AR image 250 may include an icon 251*a* indicating a category of the POI, i.e., a business type (e.g., a restaurant). Also, according to embodiments, the category-type AR image 250 may include a background 251*b* of the icon 251*a*. In this instance, the background 251*b* may be represented in different colors depending on a category of a POI, i.e., a business type.

As described above, when the vehicle 10 is travelling at a high speed and the distance to the POI is long, the vehicle 10 provides the AR image 250 that simply displays only the category, thereby may enable the user to identify the POI without impeding the user's driving.

Also, when the distance between the vehicle 10 and the POI exceeds the predetermined distance and the driving speed of the vehicle 10 is less than or equal to the predetermined speed, the vehicle 10 may adjust the AR image 250 to include information about at least one of a business type, a business, or a remaining distance.

That is, as shown in FIG. 7, when the distance between the vehicle 10 and the POI exceeds the predetermined distance and the driving speed of the vehicle 10 is less than or equal to the predetermined speed, the vehicle 10 may display the basic type AR image 250 including the information about at least one of a business type, a business, or a remaining distance in medium size by being superimposed on the front image 200.

As shown in FIG. 7, the basic type AR image 250 may include an icon 252*a* indicating the category of the POI, i.e., the business type (e.g., the restaurant), or a business (logo), a background 252*b* of the icon 252*a*, information about a business 252*c* (e.g., company name), and information about a remaining distance 252*d* (e.g., a straight distance and direction). In this instance, the background 252*b* may be represented in different colors depending on a category of a POI, i.e., a business type.

As described above, when the distance to the POI is long but the driving speed of the vehicle 10 is slow, the vehicle 10 provides the detailed AR image 250 compared to when travelling at a high speed. Accordingly, the vehicle 10 may provide more detailed information about the POI. That is, considering that an accuracy of the AR image may be decreased due to a high driving speed, when the driving speed of the vehicle 10 is slow, the vehicle 10 may increase the amount of information of the AR image 250 to efficiently provide the AR image 250.

According to an embodiment, when the distance between the vehicle 10 and the POI is less than or equal to the predetermined distance, the vehicle 10 may adjust the AR image 250 to be displayed in one of a maximum size or a medium size.

For example, when the distance between the vehicle 10 and the POI is less than or equal to the predetermined distance and the driving speed of the vehicle 10 exceeds the predetermined speed, the vehicle 10 may adjust the AR image 250 to include information about a business type, a business, and a remaining distance.

That is, as shown in FIG. 7, when the distance between the vehicle 10 and the POI is less than or equal to the predetermined distance and the driving speed of the vehicle 10 exceeds the predetermined speed, the vehicle 10 may display the basic type AR image 250 including the information about a business type, a business, and a remaining distance, in medium size by being superimposed on the front image 200.

As described above, when the distance to the POI is short but the vehicle 10 is driving fast, the vehicle 10 provides the basic type AR image 250, thereby may provide an AR image with improved accuracy.

Also, when the distance between the vehicle 10 and the POI is less than or equal to the predetermined distance and the driving speed of the vehicle 10 is less than or equal to the predetermined speed, the vehicle 10 may adjust the AR image 250 to include information about a business type, a business, a remaining distance, a price and use (e.g., information about the number of vehicles that may be parked, available charger, bus stop, bus service, subway station, certification, recommendation, business condition, signature menu, business status, etc.).

That is, as shown in FIG. 8, when the distance between the vehicle 10 and the POI is less than or equal to the predetermined distance and the driving speed of the vehicle 10 is less than or equal to the predetermined speed, the vehicle 10 may display the information-type AR image 250 including the information about a business type, a business, a remaining distance, a price and use, in maximum size by being superimposed on the front image 200.

As shown in FIG. 8, the information-type AR image 250 may include an icon 253*a* indicating the category of the POI, i.e., the business type (e.g., the restaurant), or the business (logo), a background 253*b* of the icon 253*a*, information about a business 253*c* (e.g., company name), information about a remaining distance 253*d* (e.g., a straight distance and direction) and information about use 253*e*. In this instance, the background 253*b* may be represented in different colors depending on a category of a POI, i.e., a business type. Also, although not illustrated in FIG. 8, the information-type AR image 250 may include price information.

In this instance, the price information may be information about prices for using service provided by the POI. For instance, when the POI is a parking lot, parking fees may be provided as the price information, and when the POI is a gas station, prices by fuel type may be provided as the price information.

Also, the information about use may be information required to use service provided by the POI. For example, when the POI is a parking lot, unoccupied parking spaces may be provided as the information about use, and when the POI is an electric vehicle charging station, information about a charger may be provided as the information about use. Also, when the POI is a restaurant or a café, information about a business status, business conditions, signature menu, certification (e.g., use of certified organic foods, etc.) may be provided as the information about use. In addition, when the POI is a subway station or a bus stop, information about subway service or bus service may be provided as the information about use.

As described above, when the distance to the POI is short and the vehicle 10 is driving slowly, the vehicle 10 provides the detailed AR image 250 compared to when the vehicle 10 is driving fast and the distance to the POI is long. Accordingly, the vehicle 10 may provide more detailed information about the POI.

Also, according to embodiments, the vehicle 10 may adjust the AR image 250 to include information about a user's review on the POI (e.g., a text, a photo, etc.).

In addition, according to embodiments, when the vehicle 10 is located within a predetermined distance from the POI, the vehicle 10 may receive coupon information that may be used for the service of the POI. Here, the coupon information may be transmitted from a terminal or server of the POI.

Hereinafter, embodiments of a control method of the vehicle 10 according to an aspect of the disclosure are described. The above-described vehicle 10 according to embodiments may be used for the control method of the vehicle 10. Accordingly, the description above with reference to FIGS. 1 to 8 is equally applicable to the control method of the vehicle 10.

Figure 9:
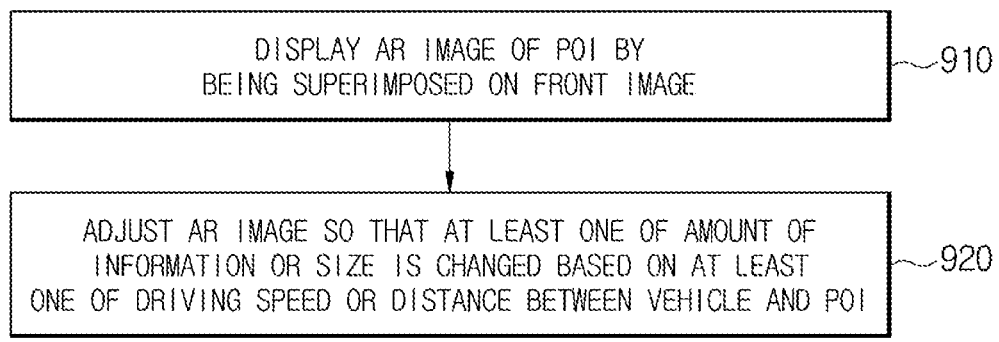
FIG. 9 is a flowchart illustrating operations of adjusting an AR image in a control method of a vehicle according to an embodiment.

FIG. 9 is a flowchart illustrating operations of adjusting the AR image 250 in a control method of the vehicle 10 according to an embodiment.

Referring to FIG. 9, the vehicle 10 according to an embodiment may display the AR image 250 of a POI by being superimposed on the front image 200 (910).

That is, the vehicle 10 may determine the POI, that is located in front of the vehicle 10 and may be photographed by the camera 110, based on location information of the vehicle 10 and location information of the POI, and also control the display module 150 to display the AR image 250 corresponding to the determined POI by being superimposed on the front image 200.

In this instance, the AR image 250 may be located at a position where the POI is located in the front image 200 based on the location information of the POI.

The AR image corresponding to the POI may be stored in the storage 160 and be updated based on information about the POI received through the communicator 120.

The AR image of the POI may include information about the POI, such as information about a business type, a business, a remaining distance, a price, use, and the like, and the amount of information and/or a size of the AR image of the POI may be adjusted based on a driving speed of the vehicle 10 or a distance between the vehicle 10 and the POI.

The vehicle 10 according to an embodiment may adjust the AR image 250 so that at least one of the amount of information or the size is changed based on at least one of a driving speed or a distance between the vehicle 10 and the POI (920).

Specifically, as the driving speed of the vehicle 10 decreases, the vehicle 10 may adjust the AR image 250 so that the amount of information and the size increase.

That is, as the vehicle 10 is driving fast, the controller 140 may reduce the amount of information, thereby may compensate for an accuracy of the AR image 250 that may be decreased at high speed. Also, the controller 140 may increase the amount of information of the AR image 250 in an area where surrounding objects are well recognized, such as a stopping area or traffic signal area, thereby may provide the user with rich service content.

Also, as the distance between the vehicle 10 and the POI decreases, the vehicle 10 may adjust the AR image 250 so that the amount of information and the size increase. That is, the controller 140 may provide detailed information when the distance to the POI is short, and provide only brief information when the distance to the POI is long to provide an intuitive AR image to a user.

In addition, according to embodiments, the vehicle 10 may adjust the AR image 250 so that a transparency is changed based on the distance between the vehicle 10 and the POI. That is, as the distance between the vehicle 10 and the POI decreases, the controller 140 may adjust the AR image 250 so that the transparency is decreased, thereby may secure a viewing angle at a long distance and provide information without impeding the user's driving.

Figure 10:
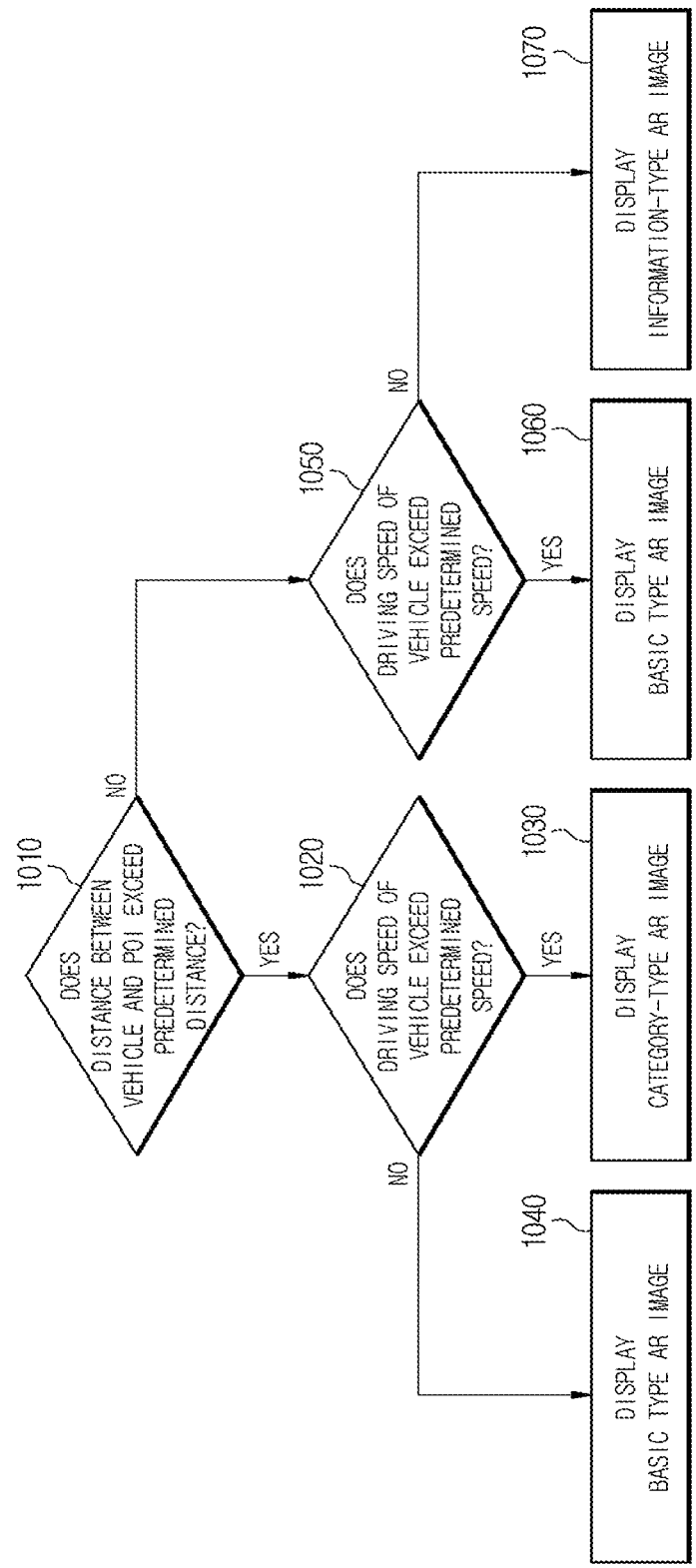
FIG. 10 is a flowchart illustrating an example of operations of adjusting an AR image in a control method of a vehicle according to an embodiment.

FIG. 10 is a flowchart illustrating an example of operations of adjusting the AR image 250 in a control method of the vehicle 10 according to an embodiment.

Referring to FIG. 10, when a distance between the vehicle 10 and a POI exceeds a predetermined distance (e.g., 20 m) (Yes in operation 1010) and a driving speed of the vehicle 10 exceeds a predetermined speed (e.g., 15 km/h) (Yes in operation 1020), the vehicle 10 may display the category-type AR image 250 (1030).

That is, when the distance between the vehicle 10 and the POI exceeds the predetermined distance and the driving speed of the vehicle 10 exceeds the predetermined speed, the vehicle 10 may display the category-type AR image 250 including information about a business type only in minimum size by being superimposed on the front image 200.

The category-type AR image 250 may include the icon 251*a* indicating the category of the POI, i.e., the business type (e.g., the restaurant). Also, according to embodiments, the category-type AR image 250 may include the background 251*b* of the icon 251*a*. In this instance, the background 251*b* may be represented in different colors depending on a category of a POI, i.e., a business type.

As described above, when the vehicle 10 is travelling at a high speed and the distance to the POI is long, the vehicle 10 provides the AR image 250 that simply displays only the category, thereby may enable a user to identify the POI without impeding the user's driving.

Also, when the distance between the vehicle 10 and the POI exceeds the predetermined distance (Yes in operation 1010) and the driving speed of the vehicle 10 is less than or equal to the predetermined speed (No in operation 1020), the vehicle 10 may display the basic type AR image 250 (1040).

That is, when the distance between the vehicle 10 and the POI exceeds the predetermined distance and the driving speed of the vehicle 10 is less than or equal to the predetermined speed, the vehicle 10 may display the basic type AR image 250 including the information about at least one of a business type, a business, or a remaining distance in medium size by being superimposed on the front image 200.

As shown in FIG. 7, the basic type AR image 250 may include the icon 252*a* indicating the category of the POI, i.e., the business type (e.g., restaurant), or the business (logo), the background 252*b* of the icon 252*a*, the information about a business 252*c* (e.g., company name), and the information about a remaining distance 252*d* (e.g., straight distance and direction). In this instance, the background 252*b* may be represented in different colors depending on a category of a POI, i.e., a business type.

As described above, when the distance to the POI is long but the driving speed of the vehicle 10 is slow, the vehicle 10 provides the detailed AR image 250 compared to when travelling at a high speed. Accordingly, the vehicle 10 may provide more detailed information about the POI. That is, considering that an accuracy of the AR image may be decreased due to a high driving speed, when the driving speed of the vehicle 10 is slow, the vehicle 10 may increase the amount of information of the AR image 250 to efficiently provide the AR image 250.

Also, when the distance between the vehicle 10 and the POI is less than or equal to the predetermined distance (No in operation 1010) and the driving speed of the vehicle 10 exceeds the predetermined speed (Yes in operation 1050), the vehicle 10 may display the basic type AR image 250 (1060).

That is, when the distance between the vehicle 10 and the POI is less than or equal to the predetermined distance and the driving speed of the vehicle 10 exceeds the predetermined speed, the vehicle 10 may display the basic type AR image 250 including the information about a business type, a business, and a remaining distance, in medium size by being superimposed on the front image 200.

As described above, when the distance to the POI is short but the vehicle 10 is driving fast, the vehicle 10 provides the basic type AR image 250, thereby may provide an AR image with improved accuracy.

Also, when the distance between the vehicle 10 and the POI is less than or equal to the predetermined distance (No in operation 1010) and the driving speed of the vehicle 10 is less than or equal to the predetermined speed (No in operation 1050), the vehicle 10 may display the information-type AR image 250 (1070).

That is, when the distance between the vehicle 10 and the POI is less than or equal to the predetermined distance and the driving speed of the vehicle 10 is less than or equal to the predetermined speed, the vehicle 10 may display the information-type AR image 250 including information about a business type, a business, a remaining distance, a price and use, in maximum size by being superimposed on the front image 200.

The information-type AR image 250 may include the icon 253a indicating the category of the POI, i.e., the business type (e.g., restaurant), or the business (logo), the background 253b of the icon 253a, the information about a business 253c (e.g., company name), the information about a remaining distance 253d (e.g., straight distance and direction) and the information about use 253e. In this instance, the background 253b may be represented in different colors depending on a category of a POI, i.e., a business type. Also, although not illustrated in FIG. 8, the information-type AR image 250 may include price information.

As described above, when the distance to the POI is short and the vehicle 10 is driving slowly, the vehicle 10 provides the detailed AR image 250 compared to when the vehicle 10 is driving fast and the distance to the POI is long. Accordingly, the vehicle 10 may provide more detailed information about the POI.

As is apparent from the above, according to the embodiments of the disclosure, the vehicle and the control method thereof can adjust an AR image of a POI based on at least one of a driving speed of the vehicle or a distance between the vehicle and the POI, thereby can improve an accuracy of the AR image and efficiently provide information about the POI without impeding a user's driving.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle, comprising:
an image sensor configured to obtain a front image of the vehicle;
a display module configured to display the front image; and
a controller configured to:
control the display module to display an augmented reality (AR) image of a point of interest (POI) included in the front image by being superimposed on the front image, and
adjust the AR image so that at least one of an amount of information of the AR image or a size of the AR image is changed based on at least one of a driving speed of the vehicle or a distance between the vehicle and the POI;
to adjust the AR image to be displayed in one of a first size or a second size or a third size, based on a predetermined speed and a predetermined distance; and
adjust the AR image to be displayed in the second size, when the distance between the vehicle and the POI is less than or equal to the predetermined distance and the driving speed of the vehicle exceeds the predetermined speed or the distance between the vehicle and the POI exceeds the predetermined distance and the driving speed of the vehicle is less than or equal to the predetermined speed.

2. The vehicle of claim 1, wherein the controller is configured to adjust the AR image so that the amount of information of the AR image and the size of the AR image increase, as the driving speed of the vehicle decreases.

3. The vehicle of claim 1, wherein the controller is configured to adjust the AR image so that the amount of information of the AR image and the size of the AR image increase, as the distance between the vehicle and the POI decreases.

4. The vehicle of claim 3, wherein the controller is configured to adjust the AR image to be displayed in one of the first size or second size when the distance between the vehicle and the POI exceeds the predetermined distance.

5. The vehicle of claim 4, wherein the controller is configured to adjust the AR image to include information about a business type only, when the distance between the vehicle and the POI exceeds the predetermined distance and the driving speed of the vehicle exceeds the predetermined speed.

6. The vehicle of claim 4, wherein the controller is configured to adjust the AR image to include information about at least one of a business type, a business, or a remaining distance, when the distance between the vehicle and the POI exceeds the predetermined distance and the driving speed of the vehicle is less than or equal to the predetermined speed.

7. The vehicle of claim 3, wherein the controller is configured to adjust the AR image to be displayed in one of the third size or the second size when the distance between the vehicle and the POI is less than or equal to the predetermined distance.

8. The vehicle of claim 7, wherein the controller is configured to adjust the AR image to include information about a business type, a business, and a remaining distance, when the distance between the vehicle and the POI is less than or equal to the predetermined distance and the driving speed of the vehicle exceeds the predetermined speed.

9. The vehicle of claim 7, wherein the controller is configured to adjust the AR image to include information about a business type, a business, a remaining distance, a price and use, when the distance between the vehicle and the POI is less than or equal to the predetermined distance and the driving speed of the vehicle exceeds the predetermined speed.

10. The vehicle of claim 1, wherein the controller is configured to adjust the AR image so that a transparency of the AR image is changed based on the distance between the vehicle and the POI.

11. A control method of a vehicle comprising an image sensor configured to obtain a front image of the vehicle and a display module configured to display the front image, the control method comprising:
   controlling, by a controller, the display module to display an AR image of a POI included in the front image by being superimposed on the front image; and
   adjusting, by the controller, the AR image so that at least one of an amount of information of the AR image or a size of the AR image is changed based on at least one of a driving speed of the vehicle or a distance between the vehicle and the POI;
   wherein adjusting the AR image comprises:
      adjusting the AR image to be displayed in one of a first size or a second size or a third size, based on a predetermined speed and a predetermined distance; and
      adjusting the AR image to be displayed in the third size, when distance between the vehicle and the POI is less than or equal to the predetermined distance and the driving speed of the vehicle exceeds the predetermined speed or the distance between the vehicle and the POI exceeds the predetermined distance and the driving speed of the vehicle is less than or equal to the predetermined speed.

12. The control method of claim 11, wherein adjusting the AR image comprises adjusting the AR image so that the amount of information of the AR image and the size of the AR image increase, as the driving speed of the vehicle decreases.

13. The control method of claim 11, wherein adjusting the AR image comprises adjusting the AR image so that the amount of information of the AR image and the size of the AR image increase, as the distance between the vehicle and the POI decreases.

14. The control method of claim 13, wherein adjusting the AR image comprises adjusting the AR image to be displayed in one of the third size or the second size when the distance between the vehicle and the POI exceeds the predetermined distance.

15. The control method of claim 14, wherein adjusting the AR image comprises adjusting the AR image to include information about a business type only, when the distance between the vehicle and the POI exceeds the predetermined distance and the driving speed of the vehicle exceeds the predetermined speed.

16. The control method of claim 14, wherein adjusting the AR image comprises adjusting the AR image to include information about at least one of a business type, a business, or a remaining distance, when the distance between the vehicle and the POI exceeds the predetermined distance and the driving speed of the vehicle is less than or equal to the predetermined speed.

17. The control method of claim 13, wherein adjusting the AR image comprises adjusting the AR image to be displayed in one of the third size or the second size a when the distance between the vehicle and the POI is less than or equal to the predetermined distance.

18. The control method of claim 17, wherein adjusting the AR image comprises adjusting the AR image to include information about a business type, a business, and a remaining distance, when the distance between the vehicle and the POI is less than or equal to the predetermined distance and the driving speed of the vehicle exceeds the predetermined speed.

19. The control method of claim 17, wherein adjusting the AR image comprises adjusting the AR image to include information about a business type, a business, a remaining distance, a price and use, when the distance between the vehicle and the POI is less than or equal to the predetermined distance and the driving speed of the vehicle exceeds the predetermined speed.

20. The control method of claim 11, further comprising;
   adjusting the AR image so that a transparency of the AR image is changed based on the distance between the vehicle and the POI.

* * * * *